(12) United States Patent
Deshpande et al.

(10) Patent No.: US 9,251,182 B2
(45) Date of Patent: *Feb. 2, 2016

(54) SUPPLEMENTING STRUCTURED INFORMATION ABOUT ENTITIES WITH INFORMATION FROM UNSTRUCTURED DATA SOURCES

(71) Applicant: International Business Machines Corporation, Armonk, NY (US)

(72) Inventors: Prasad M. Deshpande, Mumbai (IN); Mukesh K. Mohania, Agra (IN); Karin Murthy, Bangalore (IN); Deepak S. Padmanabhan, Kerala (IN); Jennifer S. Reed, Washington, DC (US); Scott Schumacher, Porter Ranch, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/798,229

(22) Filed: Mar. 13, 2013

(65) Prior Publication Data

US 2013/0325882 A1    Dec. 5, 2013

Related U.S. Application Data

(63) Continuation of application No. 13/482,015, filed on May 29, 2012.

(51) Int. Cl.
*G06F 17/30*  (2006.01)
*G06F 15/16*  (2006.01)

(52) U.S. Cl.
CPC .... *G06F 17/30292* (2013.01); *G06F 17/30303* (2013.01)

(58) Field of Classification Search
CPC .......... G06F 17/30292; G06F 17/3061; G06F 17/30616
USPC ......................................................... 707/755
See application file for complete search history.

(56) References Cited

U.S. PATENT DOCUMENTS 6,167,369 A   12/2000   Schulze
7,668,849 B1   2/2010   Narancic et al.
(Continued)

OTHER PUBLICATIONS

Murthy et al., "Exploiting Evidence from Unstructured Data to Enhance Master Data Management," submitted Jun. 6, 2012 for a conference to be held Aug. 27, 2012, 12 pages.

(Continued)

*Primary Examiner* — Alex Gofman
(74) *Attorney, Agent, or Firm* — Terry Carroll; SVL IPLaw Edell, Shapiro & Finnan, LLC

(57) ABSTRACT

A method for supplementing structured information within a data system for entities based on unstructured data analyzes a document with unstructured data and extracts attribute values from the unstructured data for one or more entities of the data system. Entity records with structured information are retrieved from the data system based on the extracted attribute values. Entity references for corresponding entities of the data system are constructed based on a comparison of the retrieved entity records and the extracted attribute values. The entity references are linked to the corresponding entities within the data system, with the entity references including extracted attributes from the unstructured data for corresponding linked entities.

7 Claims, 7 Drawing Sheets

(56) References Cited

U.S. PATENT DOCUMENTS

| | | | |
|---|---|---|---|
| 7,730,085 | B2 | 6/2010 | Hassan et al. |
| 7,831,559 | B1 | 11/2010 | Mohan et al. |
| 7,849,048 | B2 | 12/2010 | Langseth et al. |
| 2005/0091038 | A1 | 4/2005 | Yi et al. |
| 2005/0171948 | A1 | 8/2005 | Knight |
| 2006/0195460 | A1 | 8/2006 | Nori et al. |
| 2007/0016580 | A1 | 1/2007 | Mann et al. |
| 2007/0067291 | A1 | 3/2007 | Kolo et al. |
| 2007/0100834 | A1 | 5/2007 | Landry et al. |
| 2007/0276858 | A1 | 11/2007 | Cushman et al. |
| 2008/0065655 | A1 | 3/2008 | Chakravarthy et al. |
| 2008/0077555 | A1 | 3/2008 | Miller et al. |
| 2008/0263108 | A1 | 10/2008 | Herbst et al. |
| 2008/0263297 | A1* | 10/2008 | Herbst et al. ............ 711/161 |
| 2009/0187581 | A1 | 7/2009 | Delisle et al. |
| 2009/0228428 | A1 | 9/2009 | Dan et al. |
| 2009/0313041 | A1 | 12/2009 | Eder |
| 2009/0313219 | A1 | 12/2009 | Gupta et al. |
| 2009/0319930 | A1 | 12/2009 | Groh et al. |
| 2010/0138282 | A1 | 6/2010 | Kannan et al. |
| 2010/0250598 | A1 | 9/2010 | Brauer et al. |
| 2011/0145251 | A1 | 6/2011 | Lee et al. |
| 2011/0161333 | A1 | 6/2011 | Langseth et al. |
| 2011/0184983 | A1 | 7/2011 | Kwantes et al. |
| 2011/0213742 | A1 | 9/2011 | Lemmond et al. |
| 2011/0289026 | A1 | 11/2011 | Kannan et al. |
| 2013/0325881 | A1 | 12/2013 | Deshpande et al. |

OTHER PUBLICATIONS

Levenshtein et al., Soviet Physics Doklady A translation of the "Physics Sections" of the Proceedings of the Academy of Sciences of the USSR, vol. 10, No. 8, Feb. 1966, 5 pages.

Cohen et al., "Exploiting Dictionaries in Named Entity Extraction: Combining Semi-Markov Extraction Processes and Data Integration Methods," 2004, 10 pages.

Messerschmidt et al., Hidden Treasure, A global study on master data management, www.pwc.com, Nov. 2011, 102 pages.

Li et al., "Faerie: Efficient Filtering Algorithms for Approximate Dictionary-based Entity Extraction," SIGMOD '11, Jun. 12-16, 2011, pp. 529-540.

Benjelloun et al., "Swoosh: a generic approach to entity resolution," The VLDB Journal, 2008, 22 pages.

Chiticariu et al., "System T: an Algebraic Approach to Declarative Information Extraction," Proceedings of the 48th Annual Meeting of the Association from Computational Linguistics, Jul. 2010, pp. 128-137.

Chiticariu et al., "Domain Adaptation of Rule-Based Annotators for Named-Entity Recognition Task", 2010, 11 pages.

Elmagarmid et al., "Duplicate Record Detection: A Survey", IEEE Transactions on Knowledge and Data Engineering, vol. 19, No. 1, Jan. 2007, pp. 1-16.

Fan et al., "Dynamic Constraints for Record Matching," The VLDB Journal, 2010, 24 pages.

Fellegi et al., "A Theory for Record Linkage," American Statistical Association, Dec. 1969, vol. 64, No. 328, pp. 51-79.

IBM Software Information Management, Master Data Management and Accurate Data Matching, 2010, 11 pages.

Jeff Jonas, "Identity Resolution—23 Years of Practical Experience and Observations at Scale", 1SIGMOD 2006, Jun. 27-29, 2006, 1 page.

Li et al., "Extending Dictionary-based Entity Extraction to Tolerate Errors", CIKM '10, Oct. 26-30, 2010, pp. 1341-1344.

SeungJin Lim, "Cleansing Noisy City Names in Spatial Data Mining", IEEE, 2010, 8 pages.

Mansuri et al., "Integrating unstructured data into relational databases", IEEE Computer Society, 2006, pp. 1-12.

McDonald et al., "Simple Algorithms for Complex Relation Extraction with Applications to Biomedical IE", Proccedings of the 43rd Annual Meeting of the ACL, Jun. 2005, pp. 491-498.

Okazaki et al., "Simple and Efficient Algorithm for Approximate Dictionary Matching", Proceedings of the 23rd International Conference on Computational Linguistics, Aug. 2010, pp. 851-859.

Sunita Sarawagi, "Information Extraction", Foundations and Trends in Databases, vol. 1, No. 3, 2007, 117 pages.

Sarawagi et al., "Semi-Markov Conditional Random Fields for Information Extraction", 2004, 8 pages.

Richard L. Villars, "Scale Out Storage in the Content Driven Enterprise: Unleashing the Value of Information Assets", IDC, Jun. 2011, pp. 1-11.

Wang et al., "Efficient Approximate Entity Extraction with Edit Distance Constraints", SIGMOD '09, Jun. 29-Jul. 2, 2009, 12 pages.

Wick et al., "Learning Field Compatibilities to Extract Database Records from Unstructured Text", retrieved from the Internet on Jun. 15, 2012, 9 pages.

Murthy et al., "Content-Aware Master Data Management", International Conference on Management of Data, COMAD 2010, Dec. 8-10, 2010, 4 pages.

Gamon, M., "Sentiment classification on customer feedback data: noisy data, large feature vectors, and the role of linguistic analysis", Int'l. conf. on Computational Linguistics, Art. No. 841, 7 pages, 2004.

Benamara et al., "Sentiment Analysis: Adjectives and Adverbs are better than Adjectives Alone", Int'l. Conf. on Weblogs and Social Mining, Boulder, CO., Mar. 26-28, 2007, 4 pages.

Chakaravarthy et al., "Efficiently Linking Text Documents With Relevant Structured Information", VLDB, Sep. 12-15, 2006, pp. 667-678.

McDonald, "Extracting Relations From Unstructured Text", Deptartment of Computer and Information Science, University of Pennsylvania,Technical Report: MS-CIS-05-06, Apr. 15, 2005, pp. 1-26.

Mooney et al., "Mining Knowledge from Text Using Information Extraction", SIGKDD Explorations, vol. 7, Issue 1, Jun. 2005, pp. 3-10.

Sayyadian et al., "Toward Entity Retrieval Over Structured and Text Data", WIRD '04, 2004, 8 pages.

Zhu et al., "Simultaneous Record Detection and Attribute Labeling in Web Data Extraction", KDD '06, Aug. 20-23, 2006, 10 pages.

"Master Data Management", An Oracle White Paper, Sep. 2011, pp. i-iv, and 1-57.

* cited by examiner

| NAME | EMPLOYER | COUNTRY | CITY | EMAIL |
|---|---|---|---|---|
| NAME1 | XYZ1 | INDIA | DELHI | NAME1@XYZ1.COM |
| NAME2 | XYZ1 | | BANGALORE | NAME2@XYZ1.COM |
| NAME3 | XYZ2 | US | NEW YORK | |
| NAME3 | XYZ3 | | NEW YORK | NAME3@XYZ3.COM |
| NAME4 | XYZ1 | US | | |

FIG.1A

NOME1 AND NAMES4 FROM XYZ1 MET IN NEW YORK WITH NAME3 FROM XYZ2 TO DISCUSS ABC. THE MEETING TOOK PLACE ON 21. AUG 2011.

NIME2 FROM XYZ1 IN INDIA IS CURRENTLY ON A SIX MONTH ASSIGNMENT TO THE OFFICE IN NEW YORK TO HELP NAMES4 AND NAME3 WITH PLANNING ABC, A JOINT GROWTH-MARKET INITIATIVE OF XYZ1 AND XYZ2. NAME3 IS SCHEDULED TO SPEND CONSIDERABLE TIME IN INDIA LATER THIS YEAR TO OVERSEE THE EXECUTION OF ABC IN INDIA.

PLEASE CONTACT NIME2 (NAME2@XYZ1.COM) OR NAME3 (NAME3@XYZ2.COM) FOR FURTHER INFORMATION.

FIG.1B

SUPPLEMENTING STRUCTURED INFORMATION ABOUT ENTITIES WITH INFORMATION FROM UNSTRUCTURED DATA SOURCES

CROSS REFERENCE TO RELATED APPLICATIONS

The present invention claims priority to U.S. Nonprovisional application Ser. No. 13/482,015, entitled "SUPPLEMENTING STRUCTURED INFORMATION ABOUT ENTITIES WITH INFORMATION FROM UNSTRUCTURED DATA SOURCES" and filed on 29 May 2012, the disclosure of which is incorporated herein by reference in its entirety.

BACKGROUND

The present invention embodiments relate to information systems, and more specifically, to supplementing structured information about entities within a master data management (MDM) system based on references to those entities within unstructured data.

Master data management (MDM) systems integrate data from multiple structured data sources, and build a consolidated view of business entities, such as customers and products. A primary function of a MDM system is to identify multiple records that refer to the same real-world entity. This process is referred to as entity resolution, and determines that two records refer to the same entity despite the fact that the two records may not match perfectly. For example, two records that refer to the same person or entity may contain a slightly different spelling for the person's name.

Current master data management (MDM) systems are not prepared to integrate information from unstructured data sources, such as news reports, e-mails, call-center transcripts, and chat logs. However, those unstructured data sources may contain valuable information about the same entities known to the MDM system from the structured data sources. Integrating information from unstructured data sources into a MDM system is challenging since textual references to existing MDM entities are often incomplete and imprecise, and the additional entity information extracted from text should not impact the trustworthiness of MDM data.

SUMMARY

According to one embodiment of the present invention, a system supplements structured information within a data system for entities based on unstructured data. The system comprises at least one processor, and analyzes a document with unstructured data and extracts attribute values from the unstructured data for one or more entities of the data system associated with structured information. Entity records with structured information are retrieved from the data system based on the extracted attribute values. Entity references for corresponding one or more entities of the data system are constructed based on a comparison of the retrieved entity records and the extracted attribute values. The entity references are linked to the corresponding one or more entities within the data system, wherein the entity references include extracted attributes from the unstructured data for corresponding linked entities. Embodiments of the present invention further include a method and computer program product for supplementing structured information within a data system for entities based on unstructured data in substantially the same manner described above.

BRIEF DESCRIPTION OF THE SEVERAL VIEWS OF THE DRAWINGS

FIG. 1A is an illustration of example structured data pertaining to entities within a master data management (MDM) system.

FIG. 1B is an illustration of an example document with unstructured data referencing entities within the structured data of FIG. 1A.

DETAILED DESCRIPTION

Present invention embodiments utilize information from unstructured information sources to enhance structured data of entities within a master data management (MDM) system. This bridges the gap between structured and unstructured data, and enables MDM systems to provide a real 360-degree view of each entity within the MDM system. Present invention embodiments automatically extract references to existing entities from arbitrary text within the unstructured information sources, and disambiguate plural entities that are not separated by sentence or paragraph boundaries. The extracted entity references enable MDM systems to improve entity resolution and relationship discovery for existing structured master data within the MDM system.

For example, a master data management (MDM) system may determine records that refer to the same entity by comparing corresponding attribute values in each record and determining an overall matching score between the records. If the matching score is above a certain threshold, the MDM system automatically merges the records into a single entity. However, records that belong to the same entity may not match sufficiently for an automatic merge. By way of example, one or more records may be incomplete or some attribute values may be incorrect. When two records score sufficiently close to the matching threshold, the MDM system marks the two records for manual inspection, where information within unstructured data may provide evidence to enable a data analyst to decide that two records belong to the same entity.

An example structured data set of a master data management (MDM) system is illustrated in FIG. 1A. The records associated with Name3 may belong to the same entity. However, since evidence is insufficient to automatically merge these records into a single entity, the records remain unlinked in the MDM system.

Figure 1C:
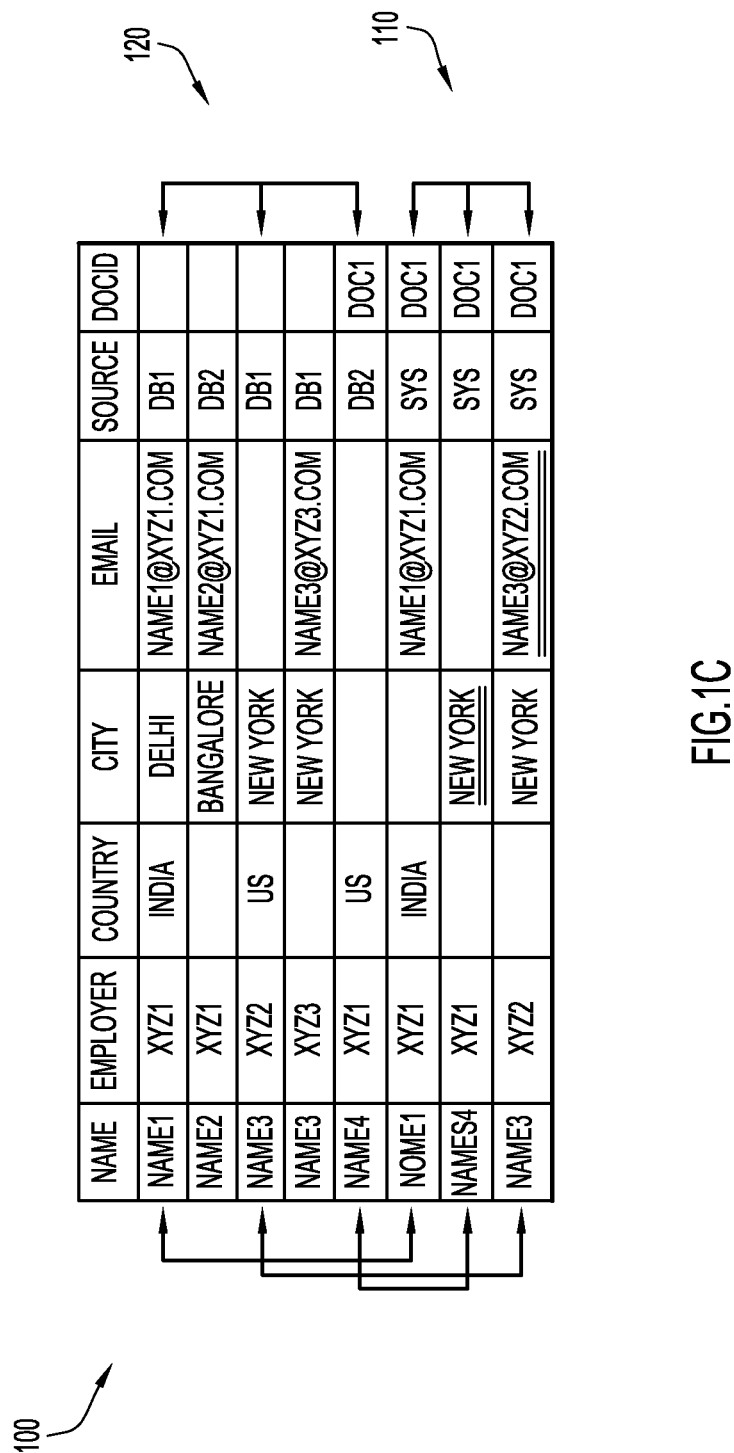
FIG. 1C is an illustration of the example structured data of FIG. 1A supplemented with information from the document with unstructured data of FIG. 1B according to an embodiment of the present invention.

An example document with unstructured data and mentioning entities of the master data management (MDM) system is illustrated in FIG. 1B. Present invention embodiments extract the mentioned entities from the document based on existing information in the MDS system, and link the extracted entities to the existing entities as shown by arrows 100 in FIG. 1C (e.g., Name1 from the document is linked to Name1, Names4 from the document is linked to Name4, and Name3 from the document is linked to Name3). The information extracted from the document by present invention embodiments may provide sufficient evidence for automatically merging records into a single entity within the MDM system, or may provide supplemental information that is linked to the existing entities within the MDM system (e.g., New York is provided for and linked to Name4 and an e-mail is provided for and linked to Name3 in FIG. 1C based on the information from the document of FIG. 1B).

In addition, present invention embodiments may improve relationship discovery. This task identifies relationships between distinct entities. Particular relationships may not be obvious and depend on the context in which the entities have interacted. For example, in a public safety scenario, certain suspicious entities may be tracked to detect any relationships between them. Documents (e.g., news reports, e-mails, or other confidential reports) typically contain information about plural entities, and capture the interaction between two entities or include indications that entities are related to each other in a certain context. By way of example, the document of FIG. 1B provides evidence that a relationship exists between Name1, Name3, and Name4 (e.g., as illustrated by arrows 110 linking these entities in FIG. 1C). Present invention embodiments extract these types of relationships from documents leading to richer master data (e.g., the corresponding existing entities Name1, Name3, and Name4 of the MDM system may be linked based on the document as illustrated by arrows 120 in FIG. 1C).

Present invention embodiments accommodate within unstructured data noisy text with entity references that are typically incomplete and uncertain. Thus, present invention embodiments are tolerant of spelling variations, allow for fuzzy matching of values, and are able to handle incomplete entity references. Since plural entities may be mentioned in the same document, and may be referenced even within the same sentence, present invention embodiments accommodate these situations and do not rely on techniques that require each entity to be mentioned within its own unit of text (e.g., a sentence or paragraph).

Further, different types of entities (e.g., products or persons) may be described by different subsets of attributes, and even the same type of entity may be described differently in different domains. For example, in a public safety scenario a person's description may include a first set of attributes (e.g., nationality, passport number, place of birth, etc.), while a human resource scenario may include a second different set of attributes (e.g., e-mail address, employee ID, salary, etc.). Accordingly, present invention embodiments accommodate these situations and do not rely on techniques that exploit domain-dependent data semantics. In addition, extraction of information from unstructured data typically produces numerous annotations, and present invention embodiments determine particular subsets of annotations that form references to existing entities within the master data management (MDM) system.

In other words, present invention embodiments provide a generic, domain-independent approach to extract entity-related information from any type of document (of any unstructured data source) with respect to any type of master data management (MDM) system. Present invention embodiments may leverage the probabilistic matching functionality provided by MDM systems to identify and supplement the entities within the MDM systems referenced by unstructured data. Further, present invention embodiments may scale to large numbers of existing entities and documents. Thus, present invention embodiments exploit structured entity data to extract entity references from arbitrary text by appropriately combining portions of extracted information to form a valid entity reference. Present invention embodiments extend structured master data to include information from unstructured data, and are applicable for a wide variety of scenarios and entity data models.

Figure 2:
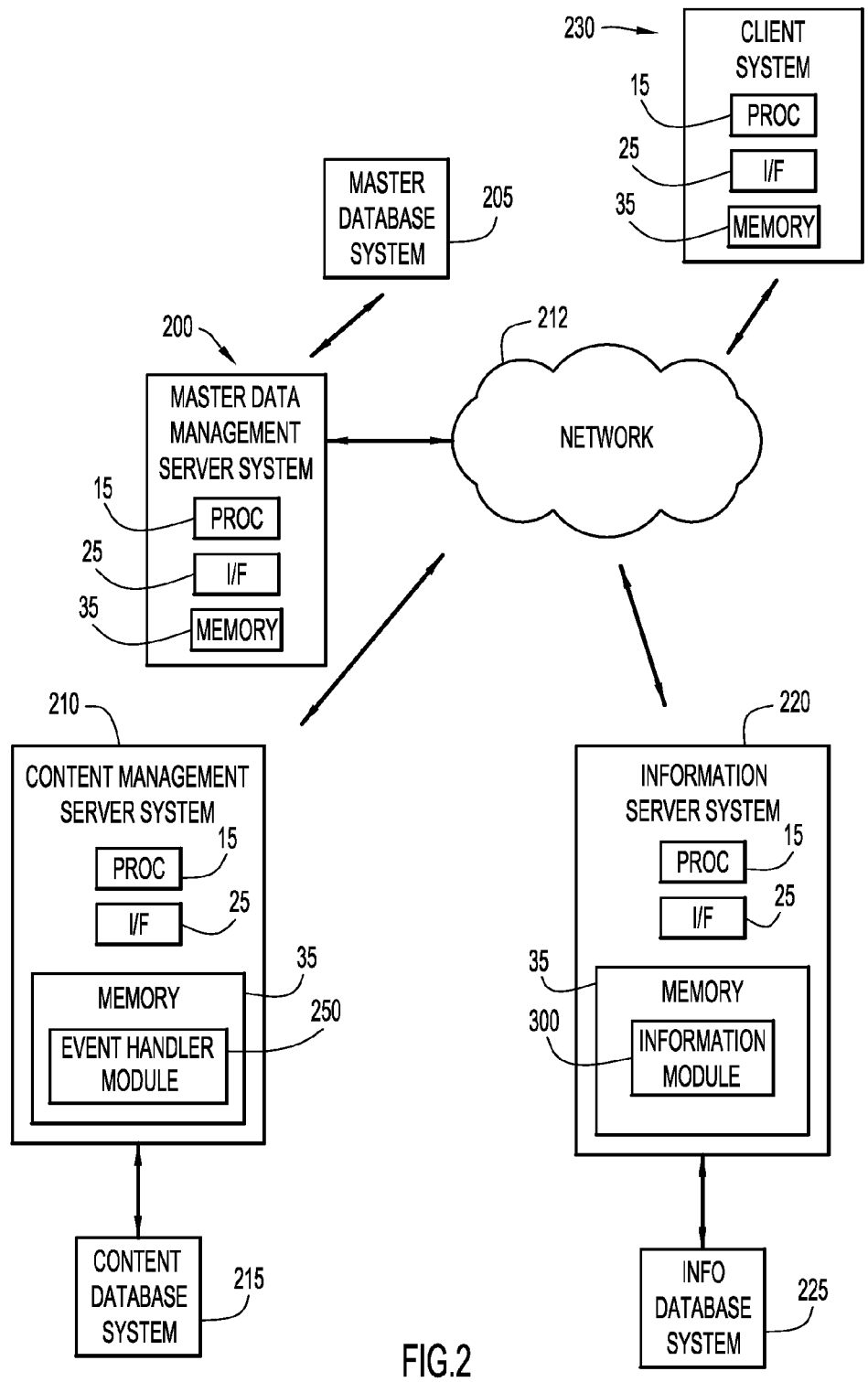
FIG. 2 is a diagrammatic illustration of an example computing environment of an embodiment of the present invention.

An example computing environment or system of a present invention embodiment is illustrated in FIG. 2. In particular, a computing environment includes a master data management server system 200, a content management server system 210, an information server system 220, and one or more client systems 230. The server systems may be physical server systems, or be implemented as virtual server systems residing on the same physical machine or on two or more different physical machines.

Server systems 200, 210, 220 and client system 230 may be remote from each other and communicate over a network 212. The network may be implemented by any number of any suitable communications media (e.g., wide area network (WAN), local area network (LAN), Internet, Intranet, etc.). Alternatively, server systems 200, 210, 220 and client system 230 may be local to each other, and communicate via any appropriate local communication medium (e.g., local area network (LAN), hardwire, wireless link, Intranet, etc.).

Master data management (MDM) server system 200 implements a master data management (MDM) system, and manages structured information concerning various entities. An entity may include a collection of data about a distinct object or subject (e.g., person, product, movie, business, etc.). The structured information may be stored in a master database system 205. The master database system may be implemented by any conventional or other database or storage unit, may be local to or remote from MDM server system 200, and may communicate via any appropriate communication medium (e.g., local area network (LAN), wide area network (WAN), Internet, hardwire, wireless link, Intranet, etc.).

Content management server system 210 implements a content management system (e.g., a file system, Enterprise Content Management (ECM) system, Filenet ECM, etc.), and manages documents including unstructured information (e.g., word processing or other application documents, e-mail, reports, etc.). The unstructured information may be stored in a content database system 215. The content database system may be implemented by any conventional or other database or storage unit, may be local to or remote from content management server system 210, and may communicate via any appropriate communication medium (e.g., local area network (LAN), wide area network (WAN), Internet, hardwire, wireless link, Intranet, etc.). The content management server system includes an event handler module 250 that detects the presence of a new or updated document and initiates extraction of information from that document to supplement the structured data as described below.

Information server system 220 performs information extraction on unstructured data from the content management system to supplement information for the structured entity data of the master data management (MDM) system. An information database system 225 stores information pertaining to the processing of the unstructured documents. The information database system may be implemented by any conventional or other database or storage unit, may be local to or remote from information server system 220, and may communicate via any appropriate communication medium (e.g., local area network (LAN), wide area network (WAN), Internet, hardwire, wireless link, Intranet, etc.). Information server system 220 includes an information module 300 to perform information extraction on unstructured data from the content management system to supplement information for the structured entity data of the master data management (MDM) system as described below.

Server systems 200, 210, 220 and/or client system 230 may present a graphical user (e.g., GUI, etc.) or other interface (e.g., command line prompts, menu screens, etc.) to solicit information from users pertaining to the desired entities or information to be extracted, and may provide reports or displays including various information.

Server systems 200, 210, 220 and client system 230 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, client/communications/browser software, applications, event handler module, information module, etc.).

Event handler module 250 and information module 300 may include one or more modules or units to perform the various functions of present invention embodiments described below. The various modules (e.g., event handler module, information module, etc.) may be implemented by any combination of any quantity of software and/or hardware modules or units, and may reside within memory 35 of the server systems for execution by processor 15.

Figure 3:
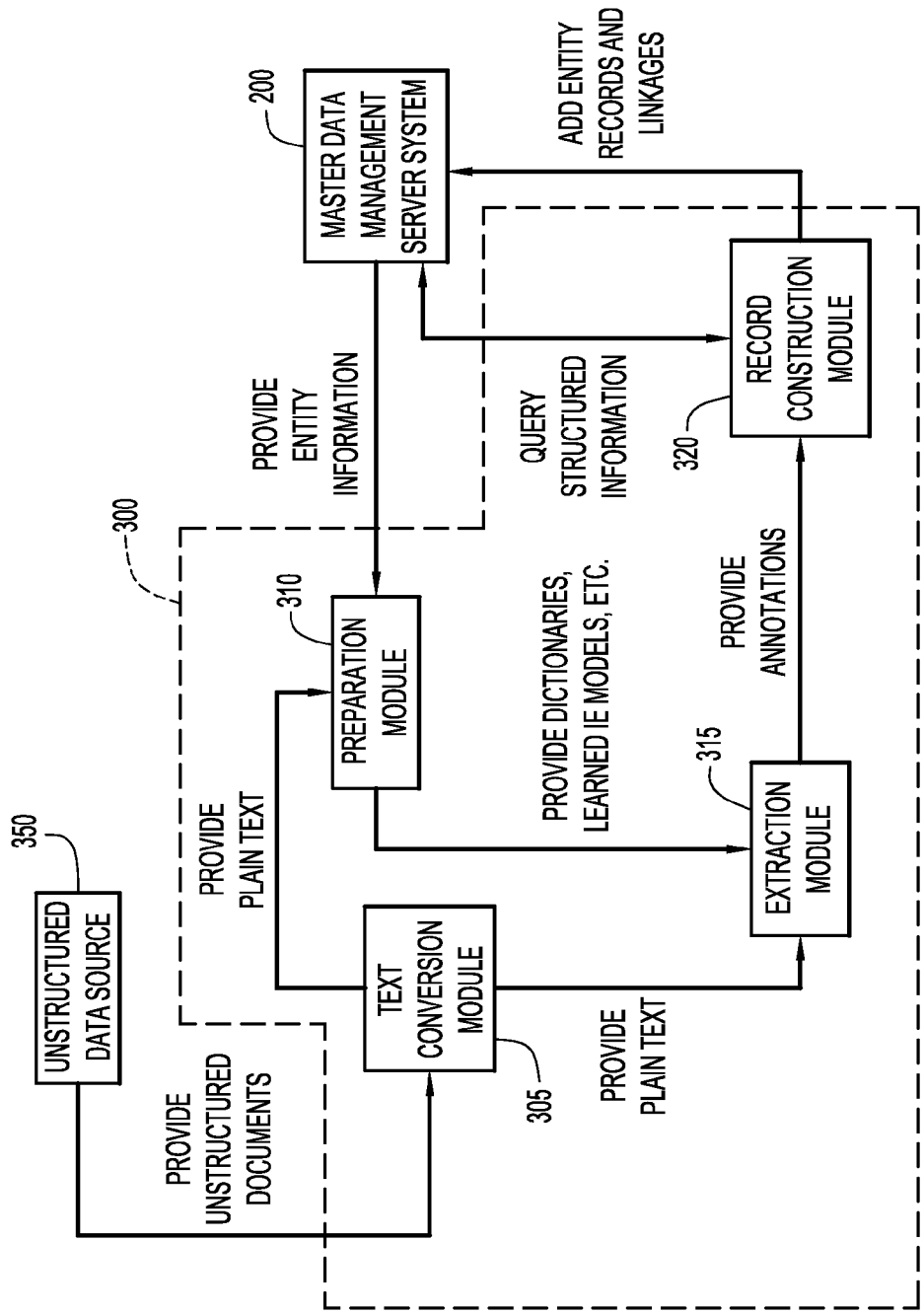
FIG. 3 is a block diagram of modules within an information server system for extracting supplemental information from unstructured data for entities within a master data management (MDM) system according to an embodiment of the present invention.

A block diagram of information module 300 to extract supplemental information from unstructured data for entities within a master data management (MDM) system according to an embodiment of the present invention is illustrated in FIG. 3. Information module 300 includes a text conversion module 305, a preparation module 310, an extraction module 315, and a record construction module 320. Text conversion module 305 receives a document with unstructured data from an unstructured data source 350 (e.g., content management server system 210 which may include a file system, Enterprise Content Management (ECM) system, etc.), and converts the document into plain text. The text conversion module may convert any type of document (e.g., PDF, DOC, HTML, etc.), and may further provide document metadata (e.g., in an Extensible Markup Language (XML) or other format).

The resulting plain text (and metadata) is provided to preparation module 310 and extraction module 315. Preparation module 310 extracts information pertaining to an entity model and dictionaries from master data management (MDM) server system 200. The entity model includes a list of attributes that describe an entity, while the dictionary provides a list of all possible values for an attribute. The preparation module queries master data management (MDM) server system 200 to extract the entity model or list of attributes describing an entity, and creates a dictionary file for each attribute including existing values for that attribute ascertained from the MDM system. The preparation module may further utilize existing structured and unstructured information to learn rules and models to assist with information extraction from the unstructured document.

The entity models, dictionaries, and learned rules and models are provided to extraction module 315. The extraction module employs these items to extract information from the unstructured document and produce annotations. An annotation includes an extracted value from the unstructured data for a specific attribute of an entity. The extraction module may employ fuzzy matching between the unstructured data and dictionary entries to produce the annotations, rule-based techniques for attributes not residing in the dictionaries (e.g., rules for attributes of type date (e.g., MM/DD/YYYY), etc.), and/or learning-based techniques. The extraction module may further employ various technologies (e.g., Unstructured Information Management Architecture (UIMA) and SystemT from IBM).

The resulting annotations are provided to record construction module 320. The record construction module detects subsets of annotations that reference an existing entity in the master data management (MDM) system. This is accomplished by querying the structured data of the MDM system to exploit the probabilistic matching capability of that system. The record construction module sends a query to the MDM system including the annotations from the extraction module. The MDM system provides the best matching entity records (e.g., satisfying a user-defined threshold) based on probabilistic matching.

Alternatively, the record construction module may determine matching entity records based on simpler queries to the MDM system and performing probabilistic or other matching, in cases where the MDM system lacks the matching capability.

The record construction module further constructs entity references from the extracted values or annotations based on the entity records retrieved from the master data management (MDM) system. An entity reference includes a set of annotation values that correspond or map to an existing entity within the MDM system. Context information extracted from the unstructured document may be added to each constructed entity reference by extracting noun phrases within close proximity in the unstructured document to an annotation that forms the entity reference.

The entity references constructed by the record construction module are inserted into the structured data of the master data management (MDM) system. The MDM system consumes entity references extracted from the unstructured document in the form of entity records, and stores the extracted entity references or records as new entities. Further, a new document entity and corresponding metadata are stored in the MDM system for each document. The MDM system further stores links between an entity reference and the referenced existing entity, and between the entity reference and the corresponding document entity. The MDM system enables existing entities to be queried for the links established by the entity references extracted from the unstructured document.

Figure 4:
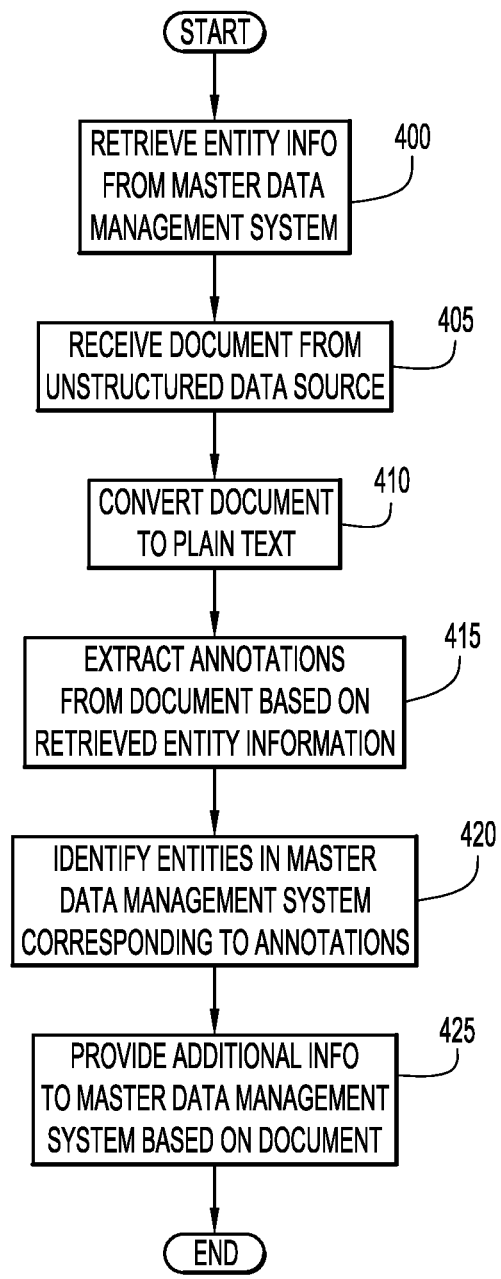
FIG. 4 is a procedural flow chart illustrating a manner of extracting supplemental information for entities within a master data management (MDM) system from unstructured data according to an embodiment of the present invention.

A manner of extracting supplemental information for entities within a master data management (MDM) system from unstructured data (e.g., via information module 300 and information server system 220) according to an embodiment of the present invention is illustrated in FIG. 4. Initially, entity information is retrieved from the master data management (MDM) system (e.g., via preparation module 310 and information server system 220) at step 400. The master data management (MDM) system provides structured data. Present invention embodiments may be employed with any MDM system or other source of structured entity data. An MDM system that encompasses sophisticated matching techniques significantly improves performance of present invention embodiments. In particular, data models for entities of interest are extracted from the MDM system, preferably during configuration. Further, a dictionary is extracted from the MDM system for each atomic attribute of an entity (e.g., lowest level attribute in the case of a composed or compound attribute having more than one sub-attribute), and includes distinct values for that attribute. For example, an entity type PERSON may include an attribute of ADDRESS including various atomic attributes (e.g., one or more atomic attributes for street, a city atomic attribute, a province atomic attribute, a postal code atomic attribute, etc.). In this case, a dictionary for each of the atomic attributes is extracted having values for those atomic attributes. The extracted dictionaries are automatically updated in response to a new dictionary entry being created within the MDM system based on new content.

Once the information is extracted, a document is received from an unstructured data source at step 405. Unstructured data may be received from various sources (e.g., content management systems (CMS) (e.g., EMC's Documentum, IBM®'s FileNet® P8, etc.)). (IBM and FileNet are trademarks of International Business Machines Corporation, registered in many jurisdictions worldwide.) Event handler module 250 may invoke information module 300 in response to detecting a document being uploaded to content management server system 200. Alternatively, unstructured data may reside in a file system, or be stored along with the structured data (e.g., a character large object (CLOB) in a database, etc.). In this case, a separate event handler module (residing on or coupled to the system hosting the file system or database) monitors the unstructured data, and invokes information module 300 in response to new data becoming available. Present invention embodiments may perform bulk-processing of all existing documents when first installed.

The received document with unstructured data is converted to plain text (e.g., via text conversion module 305 and information server system 220) at step 410. The plain text is provided for information extraction as described below. Specifically, present invention embodiments accept plain text documents, and documents in a variety of other data formats (e.g., PDF, DOC, HTML, etc.). By way of example, present invention embodiments may employ functionality provided by APACHE Tika project to convert a document to plain text. In addition, metadata may be extracted and stored in the master data management (MDM) system. For example, a universal resource indicator (URI) may be associated with each document, thereby allowing users of the MDM system to retrieve the respective document.

Alternatively, the plain text of a document may be stored in the MDM system, thereby simplifying the task of re-processing relevant documents when data within the MDM system changes, enabling users of MDM system to view the document text using traditional MDM system applications (that may not support activation of a URI to fetch the original document), and supporting cases where the original text cannot be made accessible by a URI.

The plain text information is analyzed (e.g., via extraction module 315 and information server system 220) to extract annotations based on the retrieved entity information (e.g., models, dictionaries, learned rules, etc.) at step 415. The annotations are produced from terms extracted from the document, and preferably include the attribute name and corresponding value (e.g., {attribute, value}). In particular, each atomic attribute (e.g., lowest level attribute in the case where a composed or compound attribute includes sub-attributes) is associated with a dictionary, and fuzzy matching is utilized to extract terms in the plain text that match a dictionary entry as described below. However, dictionary-based annotation may not be appropriate for all types of attributes. For example, there are numerous variations for a date, where using a dictionary to annotate the numerous variations or instances of the date would not be appropriate. In these cases, present invention embodiments may employ rule-based information extraction, where a date or other attribute is automatically detected and associated with a rule-based annotator (e.g., detecting formats or patterns within the document data that comply with the date rule or format). An appropriate date annotator may be provided with present invention embodiments.

By way of example, present invention embodiments may employ SystemT for rule-based extraction, where a date or other attribute is automatically detected and associated with a rule-based annotator, preferably written in AQL (rule language of SystemT). During execution, present invention embodiments utilize SystemT to extract dates or other attributes based on the specified AQL rules.

Information extraction of the present invention embodiments is completely domain-independent, and does not require any customization. In contrast, conventional solutions spend significant effort to develop appropriate custom annotators for each domain and setting. Further, user-developed or other annotators may be incorporated into present invention embodiments by modifying a configuration file and adding the annotators to a library. In addition, since the extraction module is preferably implemented in conjunction with an Unstructured Information Management Architecture (UIMA) framework (e.g., APACHE UIMA, etc.), other information extraction tools may be employed.

Alternatively, information extraction may be accomplished by learning-based techniques. In this case, preparation module 310 and/or extraction module 315 learn attributes from a training set and/or live data based on certain labels, where learned attributes or annotations are extracted from the unstructured data within the document.

The annotations are utilized to identify corresponding entities in the master data management (MDM) system (e.g., via record construction module 320 and information server system 220) at step 420. In particular, the record construction module uses the extracted information or annotations from a document (e.g., in the form of (attribute, value) pairs) to determine the entities in the MDM system that are referenced by the document. This functionality is typically provided by the MDM system, and may be exploited by the record construction module querying the MDM system. Once the annotations have been extracted from the document as described above, the record construction module exploits the probabilistic matching of the master data management (MDM) system by querying that system to retrieve relevant entity records.

The master data management (MDM) system uses probabilistic matching to determine the likelihood that different records refer to the same entity, and to process queries to the MDM system. The MDM system compares individual attributes of different records using one or more appropriate comparison functions. For example, in order to match names, a phonetic comparison (e.g., based on SOUNDEX) and a syntactic comparison based on an edit distance may be used.

The outputs of the comparison functions for matching the attribute values of the different records are combined to produce an attribute matching score. The individual attribute matching scores are combined to produce a record matching score indicating a likelihood that different records belong to the same entity. The MDM system applies a likelihood function to determine the probability that different values of an attribute match, and the amount of weight a given attribute contributes to the overall matching score between different records as described below.

With respect to structured data, the master data management (MDM) system may merge two or more records into a single entity. This occurs automatically in response to the record matching score exceeding an auto-link threshold. In addition, the merger may occur manually when a record matching score exceeds a review threshold for display or notification to a user, and the user determines that the records belong to the same entity.

The master data management (MDM) system is queried with the annotations extracted from a document in order to retrieve entity records that match the annotations with a sufficient record matching score. A query for the MDM system specifies a set of values from the annotations for all or a portion of the attributes. For example, a query may be utilized to request records for annotations including the name FIRST LAST and nationalities of US and Canada (e.g., NAME1=FIRST, NAME2=LAST, and NATIONALITY= (US or Canada)). The MDM system utilizes the probabilistic matching described above to match a query against entity records.

Query results are ranked based on a record matching score between attribute values within the query and within corresponding entity records. The MDM system may employ weight values to determine the contribution of a certain attribute to the overall record matching score. For example, in the case of an attribute match of a rare name, this match has a greater score relative to an attribute match of a common name. In addition, the MDM system may use negative weights to penalize negative matches. However, since information is being collected with respect to plural entities in a query, negative weights are generally not employed for present invention embodiments.

A balance is attained between recall (e.g., amount of references to an existing entity being found) and precision (e.g., amount of references found being correct references to an existing entity) by applying a user-specified minimum threshold for querying the MDM system. In other words, the MDM system returns results with record matching scores exceeding the threshold. This threshold is closely related to the auto-link and review thresholds described above for entity resolution within the MDM system.

By way of example, various threshold values have been applied to a test set. The automatically extracted entity references were applied to the entity references assigned during a manual process. The quality of the results is measured in terms of precision, recall, and F-measure for various thresholds, where the F-measure may be expressed as follows:

$$F\text{-measure}=(1+a)\cdot(\text{precision}\cdot\text{recall})/((a\cdot\text{precision})+\text{recall})), \text{ where } a=0.5.$$

Example thresholds are shown in Table I below.

TABLE I

| Threshold | Precision | Recall | F-Measure |
|---|---|---|---|
| 20 | 0.42 | 0.88 | 0.50 |
| 30 | 0.76 | 0.81 | 0.78 |
| 40 | 0.83 | 0.79 | 0.81 |
| 50 | 0.92 | 0.74 | 0.85 |
| 60 | 0.92 | 0.28 | 0.52 |
| 70 | 1.00 | 0.22 | 0.45 |

A threshold of 70 provides perfect precision, but at a cost of a significant drop in recall to only 22%. A better balance between recall and precision is achieved for a threshold of 50, where over 90% precision is achieved with a recall of 74%. If two different thresholds are used (e.g., for review and insert as described below), the review threshold may be set to 50 and the insert threshold may be set to 70.

Once the corresponding entity records within the master data management (MDM) system are retrieved, additional information ascertained from the unstructured document is provided to the MDM system (e.g., via record construction module 320 and information server system 220) at step 425. In particular, when the records that matched the annotations are retrieved, an overlap between each entity record and the set of extracted annotations is determined by employing the fuzzy matching utilized to extract the annotations from the unstructured document. The fuzzy matching compares values of the same attribute type between the retrieved records and the extracted annotations, and constructs a record that contains the best matching annotation for each attribute type.

Additional filtering may be employed on the constructed records. By way of example, if an annotation for a composed attribute (e.g., including atomic attributes or sub-attributes) contains only one atomic attribute value, but the MDM system record contains plural atomic attribute values, the match may be discarded. For example, the annotation, NAME.NAME1=FIRST, is not added to the record when the corresponding master data management (MDM) system record contains two values, NAME.NAME1=FIRST and NAME.NAME2=LAST. However, the annotation, NAME.NAME1=XYZ Company, is added to the constructed record, when the corresponding MDM system record contains only one value (NAME.NAME1=XYZ Company). This same logic is applied for all composed or compound attribute types (e.g., attributes including atomic attributes or sub-attributes).

In addition, a user can specify mandatory attributes for the constructed records. For example, the user may distrust a constructed record that does not contain either a name or an alias. In this case, the user can specify that a constructed record must contain at least one value for either the name or alias attribute. Constructed records that do not satisfy the condition are discarded before transference to the MDM system.

Alternatively, the weights used by the MDM system for probabilistic matching can be modified appropriately, to ensure that entity records that include certain attributes (e.g., a name, etc.) are scored higher during probabilistic matching. The threshold for querying the MDM system may be set high enough such that matching records without a name are not returned by the MDM system since they do not score above the threshold.

The constructed records are inserted into the master data management (MDM) system as new records. Further, each constructed record is linked explicitly to the referenced entity (e.g., determined from the attribute values (e.g., name, etc.)), and includes an additional attribute (e.g., DOCID as viewed in FIG. 1C) that contains a uniform resource identifier (URI) or other link to the document from which the record was extracted. The MDM system automatically creates a document entity for the document attribute (DOCID), and links records with the same document URI or link to the corresponding document entity. Moreover, the MDM system maintains a source attribute to distinguish between records from different data sources. Thus, the constructed records can easily be distinguished from records received from various structured data sources.

The constructed records are typically not merged with the MDM system records, but rather, are explicitly linked (by a relationship) to the corresponding MDM system record. This enables applications that depend on highly trusted data to use only records from traditional data sources, while more exploratory applications can use records independent of the data source. Alternatively, the constructed records may be handled in the same manner as records from structured data sources. In this case, the MDM system automatically merges (the constructed and existing MDM system) records that score above a certain threshold into the same entity.

The master data management (MDM) system employs different thresholds in order to determine when to merge records automatically, and when to involve user interaction. Similarly, present invention embodiments accept two different record thresholds in order to determine when to insert a constructed record into the MDM system, and when to store the constructed record external of the MDM system for review. If the record thresholds are set to the same value, records with a record matching score above the record thresholds are inserted into the MDM system. If the record threshold values are different, the constructed records that have a record matching score between the record thresholds are inserted into a separate data source external of the MDM system. This enables the MDM system to maintain a status of a trusted data source, while allowing analysts to gather more information about an entity from the external data source.

Alternatively, the records that have a record matching score between the record thresholds may be inserted into the MDM system but marked for manual review by a user.

The record construction module may employ different Application Programming Interface (API) calls to interact with the master data management (MDM) system. For example, a member search API may be utilized to retrieve a list of record identifications (ID) that match the annotation query (and exceed the record threshold). Once the record identifications (ID) are returned, a member score API may be utilized to retrieve a breakdown of the matching score for returned records. This breakdown may be inserted into the MDM system as an attribute of the relationship link between the extracted entity and the MDM system entity.

For each returned record identification (ID), a member details API may be utilized to retrieve the complete record with the attribute values. In addition, a member insert API includes API calls to insert the extracted records and to establish the relationship between each extracted record and the corresponding matching MDM system record.

Figure 5:
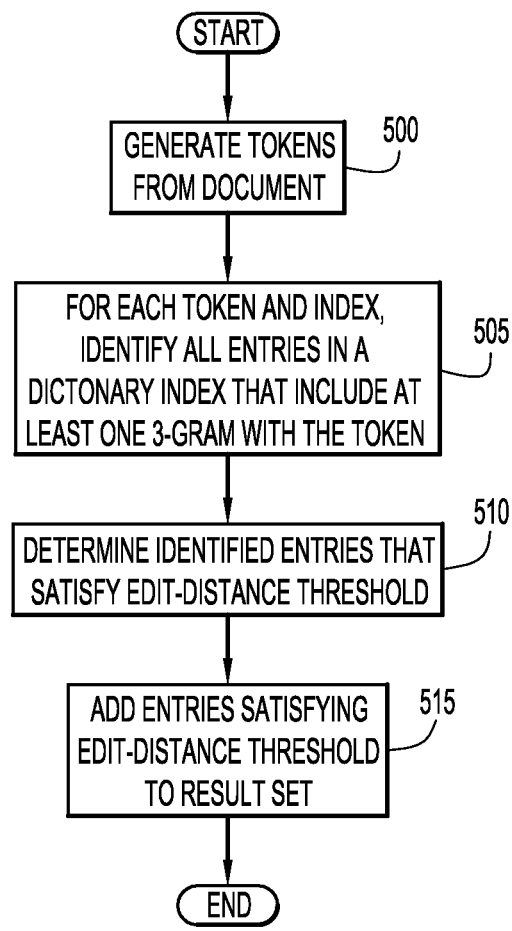
FIG. 5 is a procedural flow chart illustrating a manner of analyzing unstructured data to produce annotations pertaining to entities within a master data management (MDM) system according to an embodiment of the present invention.

A manner of analyzing a document to extract information for entities within a master data management (MDM) system (e.g., via extraction module 315 and information server system 220) according to an embodiment of the present invention is illustrated in FIG. 5. Initially, a dictionary is created for each atomic attribute of an entity within a master data management (MDM) system as described above. This exploits the presumption that any reference in a document to an existing MDM system entity is known to the MDM system. Each dictionary contains distinct values for a corresponding attribute across known MDM system entities. Each mention of a dictionary entry in a document is a potential indication that an existing entity may be referenced. Present invention embodiments treat attributes as strings and apply dictionary-based matching as a default. However, some attributes (e.g., dates) are not amenable to dictionary-based matching, and rule-based information extraction is applied as described above.

When identifying potential indications of entities within a document, present invention embodiments are robust to noise commonly associated with text data. For example, a reference to "Sara Lee" should not be bypassed if this person is referred to as "Sarah Lee" in a document. Typical types of noise (e.g., in e-mails, web documents, etc.) include spelling errors, alternative transliterations of names of non-English origin, abbreviations, vowel dropping, and non-standard words. In order to accommodate these types of noise during dictionary-based matching, an edit distance (e.g., Levenshtein distance, etc.) or other forms of fuzzy matching may be employed by present invention embodiments to determine the presence of a dictionary entry in a document.

In order to enhance efficiency, a common character n-gram constraint may be applied in the approximate matching semantics which can be checked efficiently. An n-gram denotes the set of contiguous n character substrings of a string. By way of example, present invention embodiments employ a 3-gram approach. However, any quantity of characters may be employed. For example, the 3-grams of the string "sample" include "sam", "amp", "mpl", and "ple". A string is considered to be an approximate match of another string when each of the following conditions are satisfied:

a) at least one common character 3-gram exists between the strings; and
b) the edit (e.g., Levenshtein) distance between the strings is within a default (or user-specified) threshold that varies with the length of the shorter string.

In order to provide quick verification of the first condition, an in-memory inverted index is created on character 3-grams for each attribute dictionary. The index is preferably implemented as a HashMap that maps each character 3-gram to a list of entries containing the character 3-gram.

Annotations are produced from a document of unstructured data based on an inverted index, Ii (for each attribute i), and a document. Each occurrence of an approximate match with a dictionary entry is identified and added to a result set in the form of a 3-tuple (e.g., [matched; I; entry], where the string "matched" in the document was matched with the string "entry" in the attribute dictionary index, I). Dictionary entries (or attribute values) may include plural tokens. For example, a value "New York" for an attribute of City includes two tokens.

Referring to FIG. 5, a document is processed to generate a set of tokens at step 500, where a result set is initially empty. The tokens each typically represent a corresponding word within the document. The tokens are compared to each inverted index of the dictionaries to identify each entry in the dictionary indexes that include at least one 3-gram in common with a document token at step 505.

The identified dictionary index entries are examined at step 510 to determine those entries that further satisfy the edit distance criterion described above (e.g., the edit (e.g., Levenshtein) distance between the document token and dictionary entry being within a set threshold based on the length of the shorter string). If the edit distance criterion is met, the appropriate 3-tuple (e.g., [matched; I; entry]) is added to the result set at step 515. The 3-tuples of the result set are utilized to produce the annotations (e.g., {attribute, value}) for querying the master data management (MDM) system as described above.

The determined dictionary index entries may include plural document tokens. Since a determined dictionary index entry is likely to match a token sequence in the document of similar length, the determined dictionary index entry is compared to a string comprising a sequence of document tokens including the corresponding quantity of tokens for the determined dictionary index entry and two additional document tokens in order to determine compliance with the edit distance criterion.

The sequence of document tokens is reduced by dropping a document token at the end of the sequence until a match is determined or the sequence of document tokens is exhausted. For example, the text "NewYork press has reported" includes a misspelling of "New York" since a space is absent. When considering the document token "NewYork", the extraction module identifies the city dictionary entry "New York" as a candidate match due to a common 3-gram "New". Since the quantity of tokens for "New York" is two, up to 4 document tokens (e.g., the initial quantity of tokens and two additional tokens) are considered for the comparison starting from "NewYork". The edit distance criterion is not satisfied for the pairs ["New York", "NewYork press has reported"], ["New York", "NewYork press has"] and ["New York","NewYork press"]. However, after dropping one additional document token from the document token sequence, the edit-distance criterion is satisfied for the pair ["New York", "NewYork"] (with an edit-distance of 1), and the match is added to the result set.

Attributes are often hierarchical in nature. For example, an attribute Name may include two attributes, such as FirstName and LastName. Accordingly, present invention embodiments combine atomic attribute matches (e.g., FirstName and LastName) into a single composed attribute match or 3-tuple (e.g., a single 3-tuple of ["Sarah Lee", Name, "Sara Lee"], as opposed to ["Sarah", FirstName, "Sarah"] and ["Lee", LastName, "Lee"]). A sequence of atomic attribute matches is considered a match for a composed attribute (e.g., an attribute including two or more atomic or sub-attributes) when the following conditions are satisfied:

a) the atomic attribute matches appear contiguously in the document, where two strings are considered to be contiguous if no more than three arbitrary characters appear between the strings;

b) the atomic attributes associated with the matches appear in the same order as the attributes associated with the composed attribute;

c) the quantity of atomic attribute matches is maximal; and d) at least one atomic attribute matches.

Thus, a sequence of atomic attribute matches is considered a match for a composed attribute when the sequence contains some of the atomic attributes in the same sequence as the composed attribute, the matches appear contiguously in the text, and no more matches may be included. A greedy strategy is employed to enable a match for an atomic attribute to contribute only once in a match for a composed attribute.

It will be appreciated that the embodiments described above and illustrated in the drawings represent only a few of the many ways of implementing embodiments for supplementing structured information about entities with information from unstructured data sources.

The environment or system of the present invention embodiments may include any number of computer or other processing systems (e.g., client systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, event handler module, information module, text conversion module, preparation module, extraction module, record construction module, etc.). These systems may include any types of monitors and input devices (e.g., keyboard, mouse, voice recognition, etc.) to enter and/or view information. In addition, the computer systems may host any quantity of any physical or virtual servers.

It is to be understood that the software (e.g., event handler module, information module, text conversion module, preparation module, extraction module, record construction module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., event handler module, information module, text conversion module, preparation module, extraction module, record construction module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., structured and/or unstructured data, entity records, documents, plain text, constructed records, annotations, indexes, tuples, etc.). The database systems may be implemented by any number of any conventional or other databases, data stores or storage structures (e.g., files, databases, data structures, data or other repositories, etc.) to store information (e.g., structured and/or unstructured data, entity records, documents, plain text, constructed records, annotations, indexes, tuples, etc.). The database systems may be included within or coupled to the server and/or client systems. The database systems and/or storage structures may be remote from or local to the computer or other processing systems, and may store any desired data (e.g., structured and/or unstructured data, documents, plain text, constructed records, annotations, indexes, tuples, etc.).

An entity may include any desired subject or object (e.g., person, product, service, business or company, animal, animate or inanimate object, etc.). The annotations and constructed records may include any quantity of attributes and any desired information pertaining to that attribute (e.g., values, names, relationships, etc.). Present invention embodiments may be utilized with any desired types of attributes (e.g., atomic, composed or compound, etc.) of any values pertaining to any information (e.g., characteristics, etc.) of an entity. The composed attributes may include any quantity of any types of attributes.

The various thresholds may be set to any desired values. Any values (e.g., minimum or maximum values, etc.) may be utilized to control a particular action (e.g., retrieval, review, merge/insert, etc.), where the thresholds may be compared in any desired fashion to initiate the action (e.g., greater than, less than, equal to, any combinations thereof, etc.).

Any suitable technique may be utilized to extract annotations from a document or other data set. For example, fuzzy or approximate matching to a reference set may be employed, where any desired partial match may be utilized. Further, rule-based or pattern detection techniques may be employed to extract the annotations. Moreover, learning techniques may be employed, where annotations are learned from a training set. These techniques may be applied individually, or in any combinations to the same or different types of data within the document or data set.

The entity records may be retrieved from the MDM system by any suitable matching technique (e.g., fuzzy or probabilistic matching, approximate or partial matching, exact matching, etc.). The matching may be performed within or external of the MDM system. In the external case, present invention embodiments perform the matching by generating one or more queries to retrieve corresponding records from the MDM system. The retrieved records are analyzed and compared to the query/annotations to determine matching records. Any suitable matching techniques may be employed (e.g., fuzzy or probabilistic matching, approximate or partial matching, exact matching, etc.).

The extraction of annotations may utilize any quantity of characters for the n-grams. Further, any suitable indexes based on any desired criteria may be generated to perform the n-gram or other comparisons. Any quantity of conditions or any thresholds may be utilized to determine the presence of a match (e.g., any quantity of common n-grams, any suitable values for edit distance, any lengths of strings, etc.). Any suitable techniques for determining an edit distance may be employed (e.g., Levenshtein, etc.). Moreover, any suitable quantity of additional tokens may be utilized for comparison of plural token attributes, where any quantity of the tokens may be dropped for the comparison. Any quantity of any suitable conditions may be utilized to determine the matching for composed attributes (e.g., any type of contiguous matching (e.g., adjacent or spaces between, etc.), same, different or partial order, any degree or quantity of matching terms, etc.).

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a user.

The present invention embodiments are not limited to the specific tasks or algorithms described above, but may be utilized with any structured data system to supplement the structured information with information from any unstructured (or partially unstructured) data set or source.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of supplementing structured information within a data system for entities based on unstructured data comprising:

analyzing documents with unstructured data specifying two or more entities of the structured information and interactions between those two or more entities;

identifying from the interactions within the unstructured data of the documents one or more relationships between entities of the structured information;

extracting attribute values from the unstructured data for one or more entities of the structured information base on a comparison of the unstructured data with one or more dictionaries each including values for a corresponding attribute of an entity within the data system, wherein extracting attribute values from the unstructured data includes:

generating tokens from the unstructured data and comparing the tokens to the values within the one or more dictionaries, wherein at least one value within a dictionary includes a plurality of tokens;

retrieving entity records with structured information form the data system based on the extracted attribute values;

constructing entity references for corresponding one or more entities of the data system based on a comparison of the retrieved entity records and the extracted attribute values;

linking the entity references to the corresponding one or more entities within the data system to supplement the structured information for the corresponding one or more entities with information extracted from the unstructured data, wherein the entity references include extracted attributes from the unstructured data for corresponding linked entities; and linking entities of the structured information to each other within the structured information to indicate related entities based on the one or more relationships between those entities identified form the interactions specified within the unstructured data of the documents.

2. The computer-implemented method of claim 1, wherein the data system includes a master data management system and the documents are received from a content management system.

3. The computer-implemented method of claim 1, wherein extracting attribute values from the unstructured data further includes:

extracting the attribute values from the unstructured data based on an attribute value within the unstructured data and a dictionary value including a common portion of an attribute value and being within a certain distance.

4. The computer-implemented method of claim 1, wherein an attribute of an entity includes a plurality of atomic attributes, and extracting attribute values from the unstructured data includes:

extracting attribute values for each of the individual atomic attributes from the unstructured data.

5. The computer-implemented method of claim 1, wherein constructing entity references includes:

constructing entity references for corresponding one or more entities of the data system based on a fuzzy match of the retrieved entity records and the extracted attribute values.

6. The computer-implemented method of claim 1, wherein linking the entity references includes:

merging the entity references with records of the corresponding one or more entities within the data system.

7. The computer-implemented method of claim 1, wherein linking the entity references includes:

inserting the entity references into one of the data system and an external data source based on a comparison of matching scores for the entity references with corresponding thresholds.

* * * * *